United States Patent
Kim et al.

(10) Patent No.: US 10,440,707 B2
(45) Date of Patent: Oct. 8, 2019

(54) TRANSMISSION METHOD AND APPARATUS USING SHARED TIMESLOT AND BROADCAST, AND FIRMWARE UPDATE METHOD AND APPARATUS USING THE SAME

(71) Applicant: Electronics and Telecommunications Research Institute, Daejeon (KR)

(72) Inventors: Hyunhak Kim, Daejeon (KR); Hoyong Kang, Daejeon (KR); Geon Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 113 days.

(21) Appl. No.: 15/847,124

(22) Filed: Dec. 19, 2017

(65) Prior Publication Data

US 2018/0176911 A1 Jun. 21, 2018

(30) Foreign Application Priority Data

Dec. 19, 2016 (KR) .................. 10-2016-0173857
Dec. 18, 2017 (KR) .................. 10-2017-0174579

(51) Int. Cl.
*H04W 72/04* (2009.01)
*H04W 72/12* (2009.01)
(Continued)

(52) U.S. Cl.
CPC .......... *H04W 72/0446* (2013.01); *G06F 8/65* (2013.01); *G06F 8/654* (2018.02); *H04W 4/70* (2018.02);
(Continued)

(58) Field of Classification Search
None
See application file for complete search history.

(56) References Cited

U.S. PATENT DOCUMENTS 8,472,426 B2 6/2013 Choi et al.
9,026,879 B2 * 5/2015 Varma .................. H04L 1/0006
714/748
(Continued)

FOREIGN PATENT DOCUMENTS

KR 100997660 B1 12/2010
KR 101466682 B1 12/2014
(Continued)

*Primary Examiner* — Shripal K Khajuria
(74) *Attorney, Agent, or Firm* — William Park & Associates Ltd.

(57) ABSTRACT

A network managing apparatus and a transmission method thereof are provided. The transmission method includes: broadcasting a plurality of packets using a plurality of shared timeslots shared by a plurality of network nodes for downlink communication and a base channel; determining one or more missed packets that are not received by the plurality of network nodes among the plurality of packets; determining a distributor that is to transmit the one or more missed packets and a distribution timeslot and a distribution channel for transmission of the one or more missed packets; and broadcasting transmission schedule information including information on the distributor and information on the distribution timeslot and the distribution channel using the base channel.

20 Claims, 11 Drawing Sheets

(51) Int. Cl.
*G06F 8/65* (2018.01)
*H04W 4/70* (2018.01)
*H04W 74/00* (2009.01)
*G06F 8/654* (2018.01)
*H04W 74/02* (2009.01)
*H04W 84/18* (2009.01)

(52) U.S. Cl.
CPC ......... *H04W 72/042* (2013.01); *H04W 72/12* (2013.01); *H04W 74/006* (2013.01); *H04W 74/02* (2013.01); *H04W 84/18* (2013.01)

(56) References Cited

U.S. PATENT DOCUMENTS

| | | |
|---|---|---|
| 9,198,167 B2 | 11/2015 | Jeon et al. |
| 9,819,466 B2 | 11/2017 | Yeo et al. |
| 2003/0227934 A1* | 12/2003 | White ............ H04L 1/1854 370/432 |
| 2006/0256740 A1* | 11/2006 | Koski ............ H04L 1/1854 370/278 |
| 2006/0268792 A1* | 11/2006 | Belcea ............ H04L 47/10 370/338 |
| 2007/0251835 A1* | 11/2007 | Mehta ............ A61B 5/14532 205/783 |
| 2007/0253364 A1* | 11/2007 | Wandel ............ H04L 12/66 370/329 |
| 2008/0279204 A1* | 11/2008 | Pratt, Jr. ............ G01D 21/00 370/406 |
| 2010/0265923 A1* | 10/2010 | Choi ............ H04L 1/1887 370/336 |

FOREIGN PATENT DOCUMENTS

| | | |
|---|---|---|
| KR | 1020150070636 A | 6/2015 |
| KR | 101646055 B1 | 8/2016 |

\* cited by examiner

FIG. 5

| Octets:2 | 1 | 4/10 | 2 | 2 | 4 | 8 | 1 | Variable | 1/variable | Variable | 4 |
|---|---|---|---|---|---|---|---|---|---|---|---|
| Frame Control | Sequence Number | Addressing Fields | Superframe Spec | DSME Superframe Spec | Channel Hopping Spec | Time Sync Spec | Hopping Sequence Length | Hopping Sequence | Down GTS Spec | Beacon Payload | FCS |
| MHR | | | MAC Payload | | | | | | | | MFR |

TRANSMISSION METHOD AND APPARATUS USING SHARED TIMESLOT AND BROADCAST, AND FIRMWARE UPDATE METHOD AND APPARATUS USING THE SAME

CROSS-REFERENCE TO RELATED APPLICATION

This application claims priority to and the benefit of Korean Patent Application Nos. 10-2016-0173857 and 10-2017-0174579 filed in the Korean Intellectual Property Office on Dec. 19, 2016, and Dec. 18, 2017, the entire contents of which are incorporated herein by reference.

BACKGROUND OF THE INVENTION

(a) Field of the Invention

The present invention relates to a transmission method and apparatus using a shared timeslot and broadcast.

(b) Description of the Related Art

In a current wireless personal area network (WPAN), a personal area network coordinator (PANC) allocates and manages uplinks (ULs) and downlinks (DLs) depending on WPAN subscription requests of network nodes.

The network nodes receive the uplinks and the downlinks allocated thereto.

Meanwhile, due to characteristics of a network, uplink communication occurs more frequently than downlink communication, and in the case in which the downlink communication is temporarily required, utilization of the downlinks is deteriorated.

In such a network, a data transmission method for improving efficiency of downlinks by temporarily using a small number of downlinks is required. In addition, in such a network, a data transmission method for improving efficiency of a firmware (F/W) update for the network nodes is required.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a transmission method and apparatus having advantages of efficiently transmitting data using broadcast and a shared timeslot in a network.

Further, the present invention has been made in an effort to provide a firmware update method and apparatus having advantages of efficiently updating firmware using the transmission method.

An exemplary embodiment of the present invention provides a transmission method and apparatus of efficiently transmitting data using broadcast and a shared timeslot in a network.

Another exemplary embodiment of the present invention provides a data transmission method of using both of broadcast by a network managing apparatus and indirect or direct data transmission between network nodes.

Therefore, efficient downlink data transmission may be provided.

Yet another exemplary embodiment of the present invention provides a firmware update method and apparatus of efficiently updating firmware of a plurality of network nodes.

BRIEF DESCRIPTION OF THE DRAWINGS

FIG. 5 is a view illustrating a beacon frame.

DETAILED DESCRIPTION OF THE EMBODIMENTS

Figure 1:
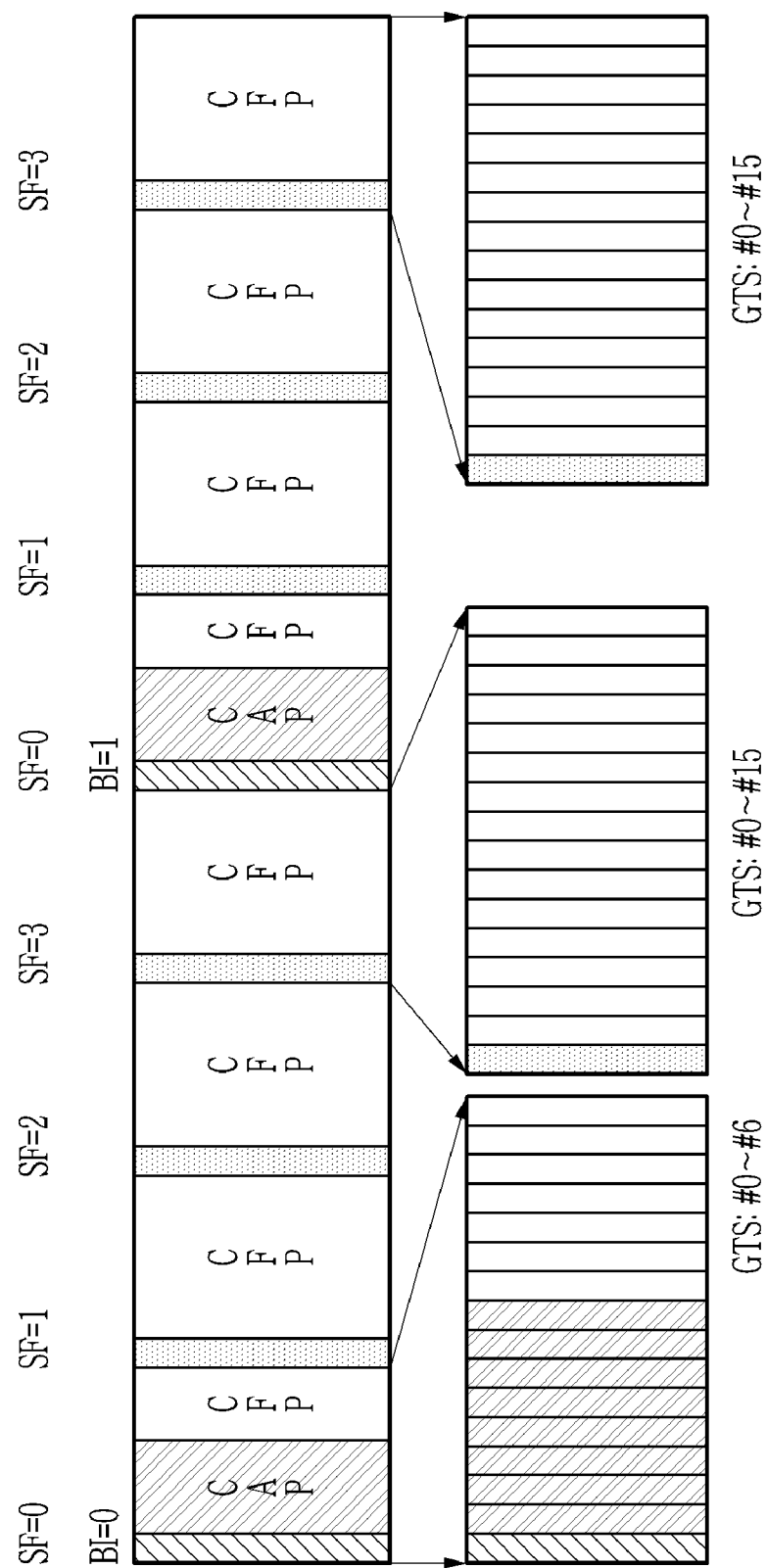
FIG. 1 is a view illustrating a method of allocating uplinks and downlinks to network nodes.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the present specification, an overlapped description for the same components will be omitted.

Further, in the present specification, it is to be understood that when one component is referred to as being 'connected to' another component, it may be connected directly to another component or be connected to another component with the other component interposed therebetween. On the other hand, in the present specification, it is to be understood that when one component is referred to as being 'directly connected to' another component, it may be connected to another component without the other component interposed therebetween.

In addition, terms used in the present specification are used only in order to describe specific exemplary embodiments rather than limiting the present invention.

Further, in the present specification, singular forms are intended to include plural forms unless the context clearly indicates otherwise.

Further, in the present specification, it will be understood that the terms 'include' or 'have', specify the presence of features, numerals, steps, operations, components, parts, or combinations thereof mentioned in the present specification, but do not preclude the presence or addition of one or more other features, numerals, steps, operations, components, parts, or combinations thereof.

Further, in the present specification, a term 'and/or' includes a combination of a plurality of stated items or any one of the plurality of stated items. In the present specification, 'A or B' may include 'A', 'B', or 'both of A and B'.

Hereinafter, a transmission method for efficiently transmitting data using broadcast and a shared timeslot in a network and a firmware update method for efficiently updating firmware using the same will be described.

FIG. 1 is a view illustrating a method of allocating uplinks and downlinks to network nodes.

In detail, a case in which a beacon is transmitted per four superframes is illustrated in FIG. 1. In FIG. 1, SF=0, SF=1, . . . mean identifiers of superframes, BI=0, BI=1, . . . mean identifiers of beacons, and GTS=0, GTS=1, . . . mean identifiers of guaranteed timeslots (GTSs). For example, a beacon BI=0 exists in a first superframe SF=0 of the four superframes SF=0, SF=1, . . . , SF=3, and a beacon BI=1 exists in a first superframe SF=0 of other four superframes SF=0, SF=1, . . . , SF=3.

The superframe SF=0 may include a beacon, a contention access period (CAP), and a contention-free period (CFP). One superframe may include sixteen timeslots. The CFP belonging to the superframe SF=0 may include seven GTSs GTS=0, GTS=1, . . . , GTS=6, and the superframe SF=1, SF=2, or SF=3 may include sixteen GTSs GTS=0, GTS=1, . . . , GTS=15. In the first timeslot included in the superframe, the beacon may be transmitted.

In a wireless personal area network (WPAN), a personal area network coordinator (PANC) allocates and manages uplinks and downlinks depending on WPAN subscription requests of network nodes.

The WPAN subscription requests of the network nodes and subscription approval for the WPAN subscription requests are performed in a CAP period.

The network nodes may receive at least one GTS allocated as dedicated uplinks and downlinks for the network nodes in a CFP period at the time of the WPAN subscription requests. In this case, the network nodes receive the allocated uplinks and downlinks to configure a network.

In detail, in the WPAN, the PANC may allocate a plurality of GTSs for the uplinks and the downlinks as dedicated uplinks and downlinks for the network nodes depending on the WPAN subscription requests of the network nodes. Therefore, efficiency of the network is deteriorated.

In a network environment in which any one of uplink communication and downlink communication mainly occurs, it is inefficient to allocate both of the uplinks and the downlinks to the network nodes. For example, due to characteristics of the network, uplink communication occurs more frequently than downlink communication, and in the case in which the downlink communication is temporarily required, utilization of the downlinks is deteriorated.

In order to solve such a problem, when communication mainly occurs in only the uplinks, only the uplinks may be allocated to the network nodes, and the downlinks may be shared and may be allocated to the network nodes so as to be used depending on the necessity of the network nodes.

Particularly, in a wireless network, in the case in which a network managing apparatus needs to effectively transmit one common packet to a plurality of network nodes (for example, 1:N transmission), the uplinks and the downlinks need to be controlled.

Hereinafter, a network managing method and apparatus for solving a problem that efficiency of the WPAN is deteriorated will be described. In addition, a data transmission method and apparatus for improving efficiency of downlinks by temporarily using a small number of downlinks will be described. In addition, a data transmission method and apparatus for improving efficiency of a firmware update for network nodes will be described.

The network managing apparatus may transmit and receive data to and from one or more network nodes subscribed to the network using timeslots. In detail, the network managing apparatus may broadcast one or more data units to the network nodes subscribed to the network. The network managing apparatus may receive unreceived data information indicating data units that are not received by the network nodes among the broadcast one or more data units from the network nodes. In addition, the network managing apparatus may retransmit one or more data units to one or more network nodes on the basis of the unreceived data information.

Figure 2:
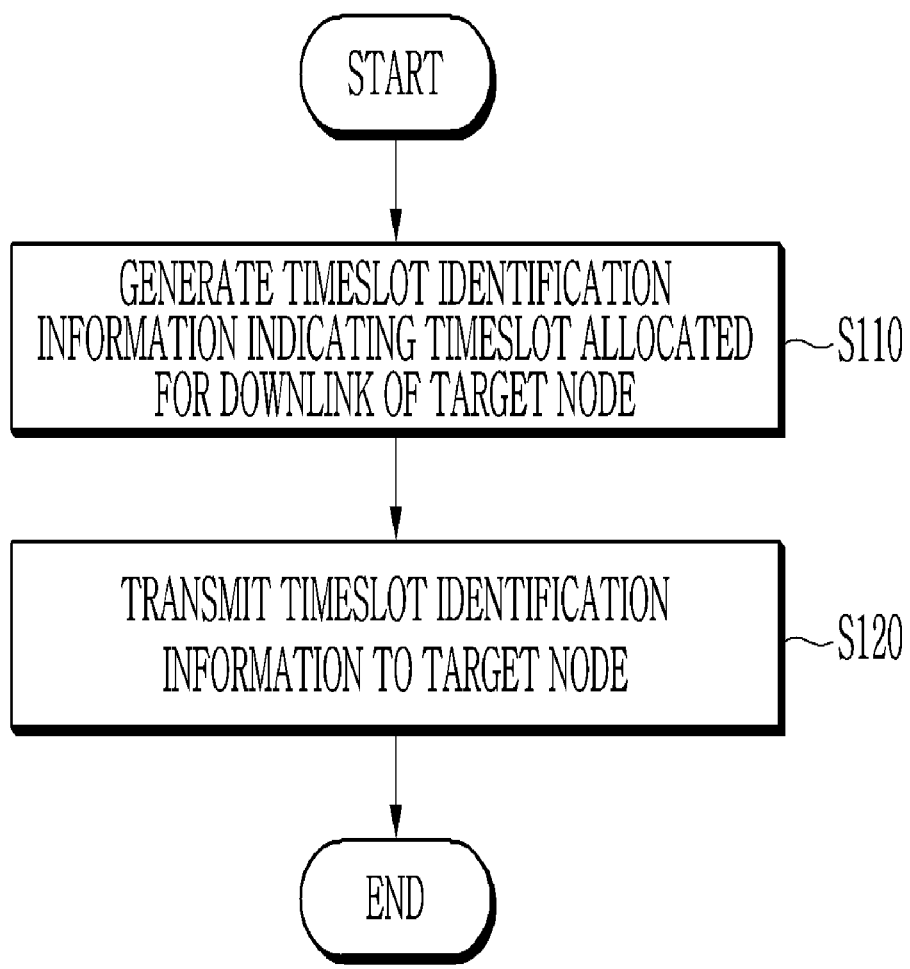
FIG. 2 is a view illustrating a network managing method according to an exemplary embodiment of the present invention.

FIG. 2 is a view illustrating a network managing method according to an exemplary embodiment of the present invention.

A network coordinator (hereinafter, referred to as a 'coordinator') generates timeslot identification information indicating a timeslot allocated for a downlink of a target network node (target network nodes) (S110).

The timeslot allocated for the downlink of the target network node (hereinafter, referred to as a 'target node') may be a timeslot in which allocation for the target node is guaranteed. The timeslot allocated for the downlink of the target node may be determined among shared timeslots. Therefore, the timeslot allocated for the downlink of the target node may be the shared timeslot.

The timeslot identification information generated in S110 may include at least one of a beacon identifier (ID) and a superframe identifier (ID), and a slot identifier (ID).

Then, the coordinator transmits the timeslot identification information to the target node (nodes) (S120).

Figure 3:
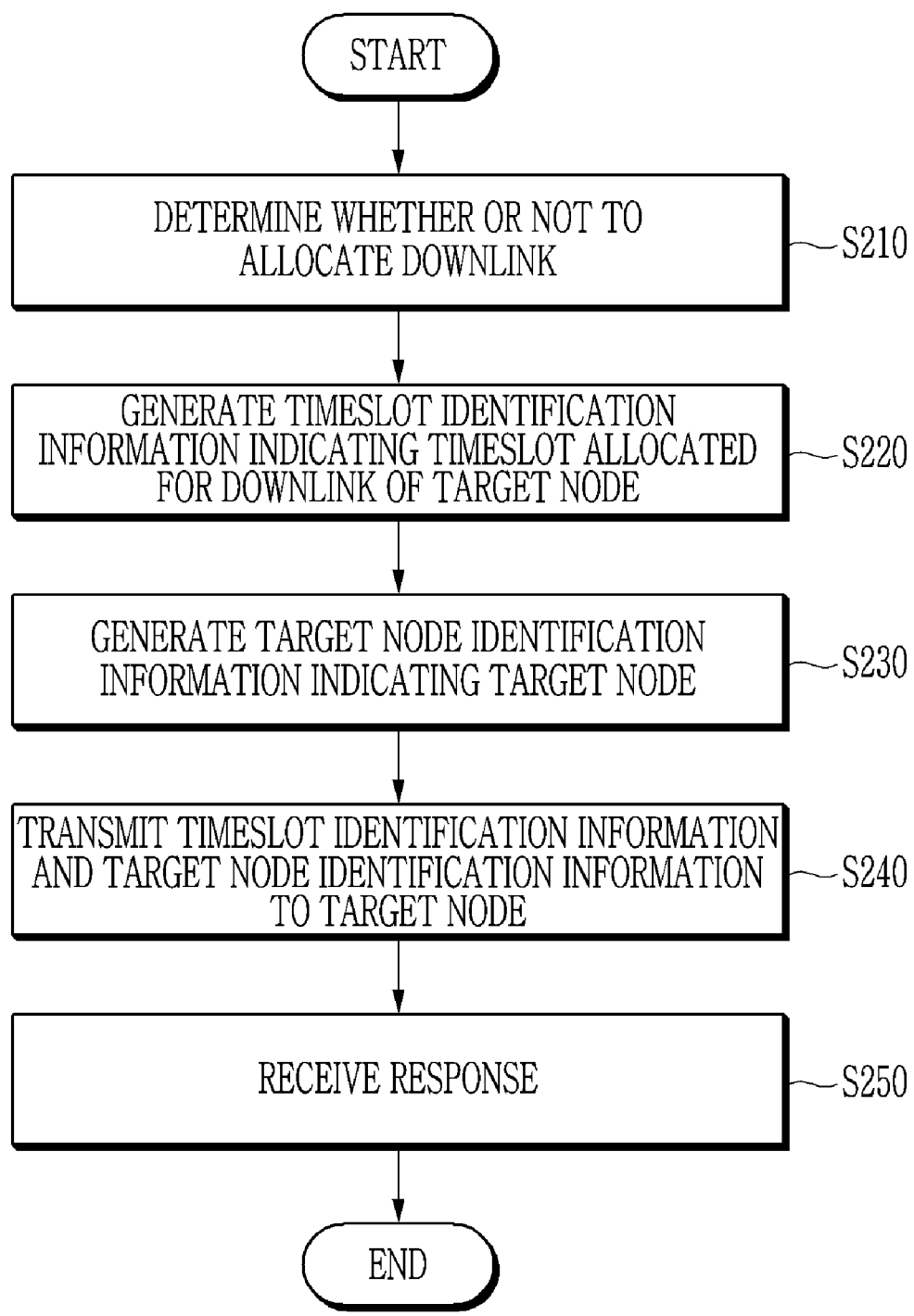
FIG. 3 is a view illustrating a network managing method according to another exemplary embodiment of the present invention.

FIG. 3 is a view illustrating a network managing method according to another exemplary embodiment of the present invention. A description for contents that are the same as those of the network managing method illustrated in FIG. 2 in the network managing method illustrated in FIG. 3 will be omitted.

First, the coordinator determines whether or not to allocate a downlink to a target node (target nodes) (S210).

Then, the coordinator generates timeslot identification information indicating a timeslot allocated for the downlink of the target node (nodes) (S220).

Then, the coordinator generates target node identification information indicating the target node (nodes) (S230). The coordinator may use a target node identifier (ID) recognition manner used in a corresponding network for the purpose of the target node identification information.

Then, the coordinator transmits the timeslot identification information and the target node identification information to the target node (nodes) (S240). In detail, the coordinator may transmit the timeslot identification information and the target node identification information to the target node (nodes) using one timeslot. Alternatively, the coordinator may transmit the timeslot identification information and the target node identification information to the target node (nodes) using different timeslots.

Then, the coordinator receives a response to reception of the timeslot identification information and the target node identification information from the target node (nodes) (S250). S250 may be omitted, if necessary.

Hereinafter, a downlink communication method using a shared timeslot will be described with reference to an example of network nodes subscribed to a star network through a PANC in a WPAN. However, the start network is only an example. The present invention is not limited to a type of network.

As described above with reference to FIG. 1, the network nodes receive a predetermined number of timeslots allocated for the uplinks/the downlinks, and perform communication. Since there is a limitation in the number of timeslots due to a configuration of the network, the number of network nodes that may be subscribed to the network may also be limited.

Figure 4:
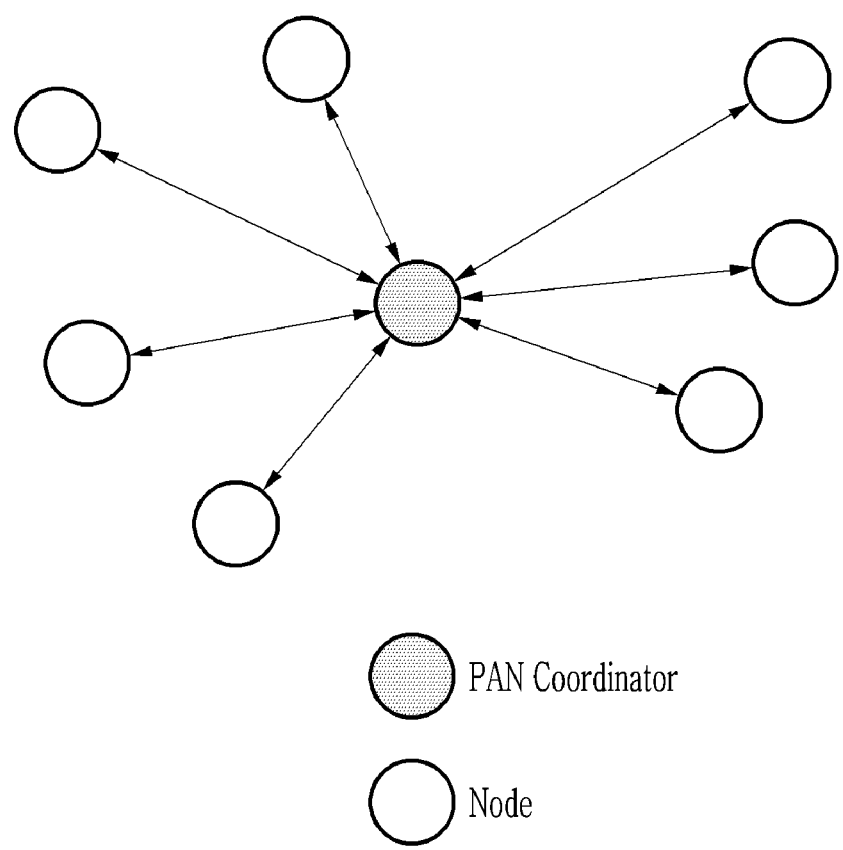
FIG. 4 is a view illustrating a star network including one personal area network coordinator (PANC) and a plurality of network nodes.

FIG. 4 is a view illustrating a star network including one personal area network coordinator (PANC) and a plurality of network nodes. In addition, FIG. 5 is a view illustrating a beacon frame.

In the star network illustrated in FIG. 4, when the network nodes mainly serve as sensors collecting data and mainly use only communication using uplinks among communications with the PANC and a frequency at which the network nodes use communication using downlinks among the communications with the PANC is very small, it causes resource waste of the network that the PANC fixedly allocates timeslots for the downlinks, since a use frequency of downlink timeslots is small.

When the wasted downlink timeslots are not allocated to individual network nodes, the corresponding timeslots may be utilized for uplink timeslots. Therefore, the number of new uplink timeslots that may be allocated to the respective network nodes is increased, and the number of timeslots for subscription of the network nodes to the network may thus be increased.

Since a case of requiring a downlink in which the PANC transmits data to the network nodes infrequently occurs, a method of securing a predetermined number of downlink timeslots and then allowing the network nodes to share the predetermined number of downlink timeslots with each other may improve utilization efficiency of the timeslots.

In order to perform the downlink communication using the shared timeslots, the PANC may insert target node identification information indicating a target node, which is a downlink communication target, and timeslot identification information indicating the shared timeslots (for example, positions of the shared timeslots) into a 'down GTS specification' field of fields included in the beacon frame of FIG. 5. Here, the 'down GTS specification' field is a field related to a GTS for the downlink.

The beacon frame illustrated in FIG. 5 includes a media access control (MAC) header MHR, an MAC payload, and an MAC footer MFR. The MHR of the beacon frame includes a 'frame control' field of 2 octets, a 'sequence number' field of 1 octet, and an 'addressing' field of 4 or 10 octets. The MAC payload of the beacon frame includes a 'superframe specification' field of 2 octets, a 'distributed synchronous multichannel extension (DSME) superframe specification' field of 2 octets, a 'channel hopping specification' field of 4 octets, a 'time synchronization specification' field of 8 octets, a 'hopping sequence length' field of 1 octet, a 'hopping sequence' field of a variable octet, a down GTS specification' field of 1 or a variable octet, and a 'beacon payload' field of a variable octet. The MFR of the beacon frame includes a 'frame check sequence (FCS)' field of 4 octets.

Figure 6:
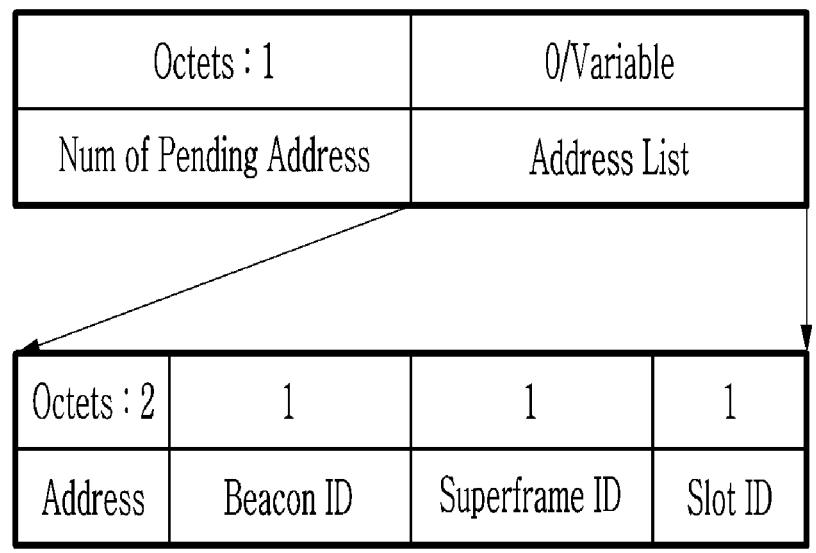
FIG. 6 is a detailed octet of a 'down guaranteed timeslot (GTS) specification' field.
Figure 7:
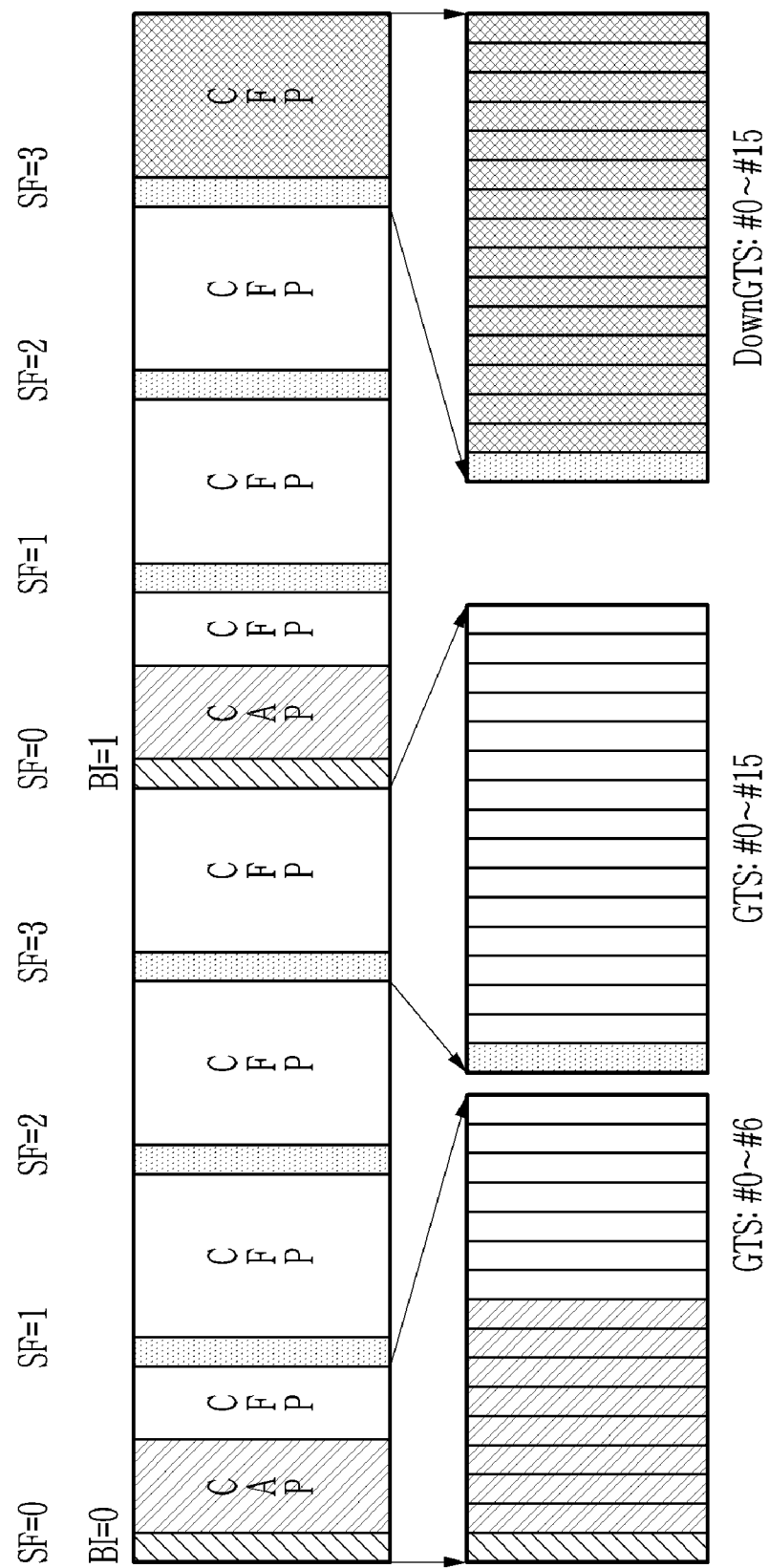
FIG. 7 is a view illustrating shared downlink GTSs.

FIG. 6 is a detailed octet of a 'down GTS specification' field. In addition, FIG. 7 is a view illustrating shared downlink GTSs.

In addition, the down GTS specification' field may include a 'number of pending address' field of 1 octet and an 'address list' field of 0 or a variable octet.

The 'number of pending address' field means the number of network nodes that are to perform downlink communication through a downlink GTS. Information on the network nodes that are to perform the downlink communication is included in the 'address list' field.

The 'address list' field includes an 'address' field of 2 octets, a 'beacon ID' field of 1 octet, a 'superframe ID' field of 1 octet, and a 'slot ID' field of 1 octet. In the case in which a value of the 'number of pending address' field means one network node, the 'address list' field may include one 'address' field, one 'beacon ID' field, one 'superframe ID' field, and one 'slot ID' field. In the case in which a value of the 'number of pending address' field means a plurality of network nodes, the 'address list' field may include a plurality of 'address' fields, a plurality of 'beacon ID' fields, a plurality of 'superframe ID' fields, and a plurality of 'slot ID' fields.

The 'address' field includes an address value of a network node that is to perform the downlink communication.

A position of the downlink GTS (or a position of the shared timeslot) used for the downlink communication may be provided through the 'beacon ID' field, the 'superframe ID' field, and the 'slot ID' field. For example, in FIG. 7, in the case in which a value (BI) of the 'beacon ID' field is 1, a value (SF) of the 'superframe ID' field is 3, and a value (DownGTS) the 'slot ID' field is 0, downlink data may be transmitted in a first GTS DownGTS=0 of shared downlink GTSs DownGTS=0, DownGTS=1, . . . , DownGTS=15. In FIG. 7, a case in which sixteen timeslots included in a superframe SF=3 of four superframes SF=0, SF=1, . . . , SF=3 corresponding to the beacon BI=1 are secured as shared timeslots (for example, DownGTS=0, Down-GTS=1, . . . , DownGTS=15) for the downlink is illustrated.

A technology of transmitting packets through a plurality of channels and a plurality of timeslots in the network environment described above is possible. However, it may not be solved how to efficiently use these resources due to a nondeterministic polynomial time (NP)-complete limitation called graph coloring.

Therefore, in order for an apparatus having limited calculation ability, such as a terminal, to use or allocate resources, a method of finding a heuristic solution which is not an optimal solution is required.

In detail, a method of performing a firmware update through heuristic channel setting will be described.

First, an apparatus (for example, the network managing apparatus) may heuristically allocate packets to the timeslots using the number (SN) of source nodes having all the packets, the number (CN) of available channels, the number (TSN) of available timeslots belonging to one turn (hereinafter, referred to 'ST10').

Then, the apparatus (for example, the network managing apparatus) may divide the number (PN) of missed packets of all the packets by the number (SN) of available source nodes, and divide a result obtained by the division by the number (CN) of available channels, and control a result obtained by the division to be a multiple of the number (TSN) of available timeslots belonging to one turn (hereinafter, referred to 'ST11'). The available timeslots belonging to one turn may be the shared timeslots (for example, DownGTS of FIG. 7) described above.

For example, in the case in which the number (PN) of missed packets is 13, the number (SN) of source nodes is 1, the number (CN) of available channels is 2, and the number (TSN) of available timeslots belonging to one turn is 4, the apparatus (for example, the network managing apparatus) may calculate PN/SN/CN=13/1/2=6.5, and calculate 8, which is the minimum number of timeslots for transmitting 6.5 packets while being a multiple of 4, which is the number (TSN) of available timeslots. That is, since the number (TSN) of available timeslots belonging to one turn is 4, the minimum number of timeslots for transmitting all of 6.5 packets while being the multiple of 4 is 8.

Then, the apparatus (for example, the network managing apparatus) may determine eight packets (for example, Pkt F, Pkt A, Pkt U, . . . ) in an order of packets that are not most received by the network nodes among the transmitted packets, and basically allocate the determined eight packets to a base channel of the available channels (hereinafter, referred to 'ST12').

Then, the apparatus (for example, the network managing apparatus) may allocate packets (for example, packets that are not allocated in ST12) that are not yet allocated among the transmitted packets to the timeslots and the available channels (hereinafter, referred to as 'ST13'). In detail, the apparatus (for example, the network managing apparatus) may dispose the packets (for example, the packets that are not allocated in ST12) that are not yet allocated in the same timeslot as the timeslot in which the packets allocated in ST12 are disposed and a channel different from the channel in which the packets allocated in ST12 are disposed. In this case, the apparatus (for example, the network managing apparatus) may dispose the packets (for example, the packets that are not allocated in ST12) that are not yet allocated in an additional channel (a channel different from the base channel) in an order in which redundancy between reception network nodes allocated to the timeslot does not exist or is smallest.

When there are a plurality of candidate packets satisfying such a disposition rule, the apparatus (for example, the network managing apparatus) may provide a priority to a packet satisfying a first disposition condition among the plurality of candidate packets. Here, the first disposition condition may include a condition in which packets are disposed, the number of network nodes that may receive the corresponding packets is large and the number of network nodes that already receive the corresponding packets is small.

The apparatus (for example the network managing apparatus) may perform this additional channel disposition on the basis of the channels or the timeslots. As an example, the apparatus (for example, the network managing apparatus) may preferentially dispose packets in a first channel (first channels for different timeslots) of a plurality of available channels, and then dispose other packets in a second channel (second channels for different timeslots). As another example, the apparatus (for example, the network managing apparatus) may preferentially dispose packets in a first timeslot (channels for a first timeslot) of a plurality of available timeslots, and then dispose other packets in a second timeslot (channels for a second timeslot).

Here, in the case in which packets that are not received by the network nodes that will perform packet transmission through the channel in the timeslot exist, such that the network nodes are already set to receive the corresponding packets through another channel in the corresponding timeslot, the apparatus (for example, the network managing apparatus) may exclude the packets to be transmitted by the network node from the abovementioned additional channel disposition.

In addition, in the case in which the packets that are not received by all the network nodes exist, the apparatus (for example, the network managing apparatus) may not dispose additional packets in a channel different from a channel in which the corresponding missed packets are disposed among available channels for the timeslot in which the corresponding missed packets are disposed.

A method of disposing the additional channels described above may be divided into a method (hereinafter, referred to as 'method M100') of disposing the additional channels so that redundancy between the reception network nodes does not exist and a method (hereinafter, referred to as 'method M200') of disposing the additional channels so that redundancy between the reception network nodes is minimized. Hereinafter, the method M100 will be described, and the method M200 will be then described.

The network managing apparatus may use a data transmission method to be described below for the purpose of firmware update of network nodes belonging to a network. In addition, the network managing apparatus may use the network managing method (for example, the network managing method of FIG. 3) described above for the purpose of downlink communication with the network nodes.

Figure 8:
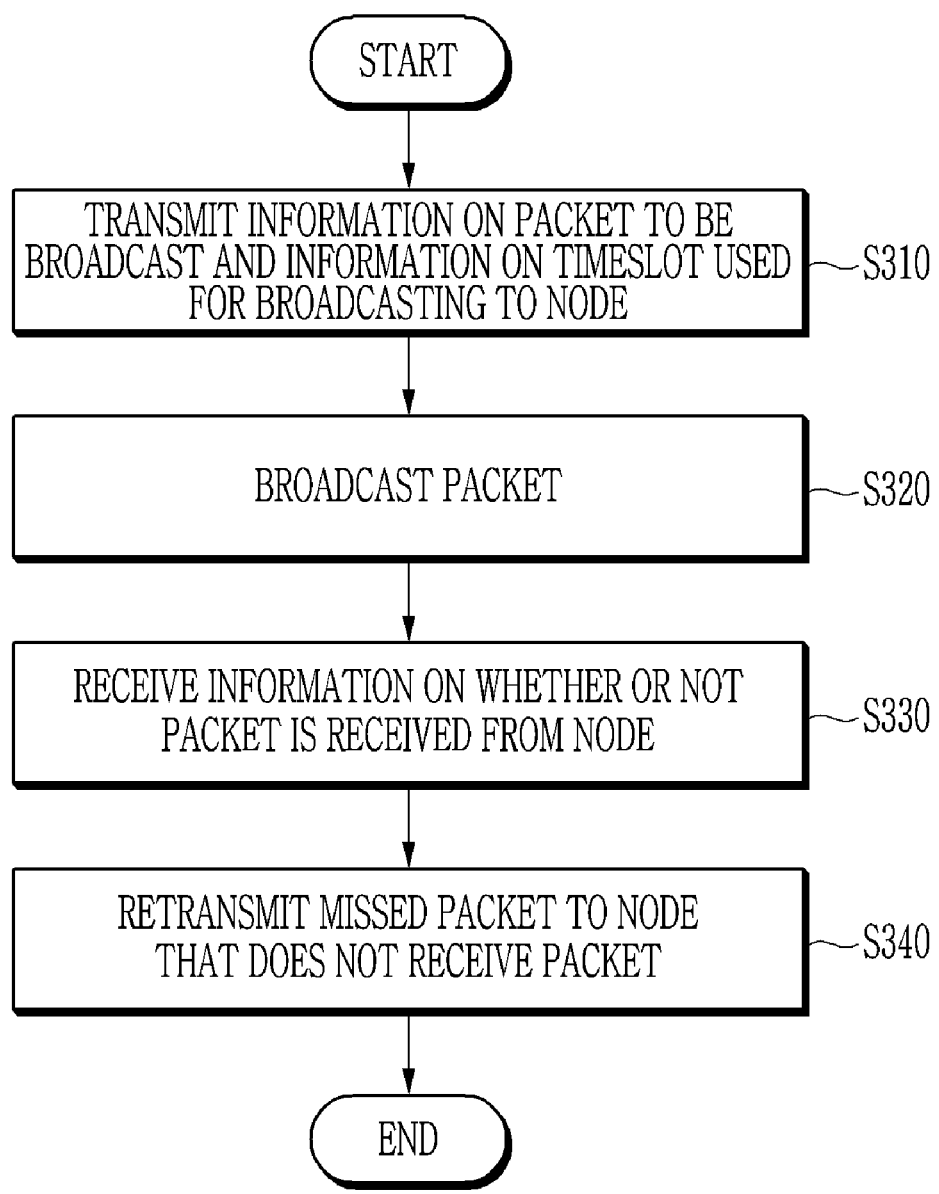
FIG. 8 is a view illustrating a data transmission method according to an exemplary embodiment of the present invention.

FIG. 8 is a view illustrating a data transmission method according to an exemplary embodiment of the present invention.

First, the network managing apparatus (for example, the PANC) transmits information on a packet (packets) to be broadcast and information on a timeslot (timeslots) used for the broadcasting to network nodes (S310). Here, the network nodes are network nodes belonging to a network. For example, in the case in which the network is a sensor network, the network nodes may be sensor configuring the sensor network. The timeslot used for the broadcasting may be the shared timeslot (for example, DownGTS of FIG. 7) described above. The information on the timeslot used for the broadcasting may be the timeslot identification information described above.

Then, the network managing apparatus broadcasts a packet (packets) to the network nodes (S320).

Then, the network managing apparatus receives information on whether or not the broadcast packet (packets) is received from the network nodes (S330).

Then, the network managing apparatus retransmits a missed packet (packets) to a network node (nodes) that does not receive the packet (packets) (S340).

As an example, in the case in which a first network node does not receive a first packet, the first network node may directly receive the first packet retransmitted from the network managing apparatus. As another example, in the case in which a first network node does not receive a first packet, the first network node may directly receive the first packet from another network node receiving the first packet. As yet another example, in the case in which a first network node does not receive a first packet and a second packet, the first network node may receive the first packet from the network managing apparatus, and receive the second packet from another network node receiving the second packet.

In the case in which a plurality of channels exist in one timeslot, some of the plurality of channels may be used for the network node to receive the packet from the network managing apparatus, and the other of the plurality of channels may be used for the network node to receive the packet from another network node. For example, in the case in which four channels exist in one timeslot, channel 1 and channel 2 of the four channels may be used for the network managing apparatus to transmit a packet to a first network node, a second network node, and a third network node, and channel 3 and channel 4 of the four channels may be used to transmit a packet between the network nodes. In this case, the network managing apparatus may transmit a missed packet (packets) to the first network node, the second network node, and the third network node using channel 1 and channel 2. In addition, the first network node, the second network node, and the third network node may transmit a packet (packets) therebetween using channel 3 and channel 4.

In order to transmit data in the network as described above, the network managing apparatus may generate a data transmission schedule (for example, information on a timeslot and a channel in which the packet is disposed), and transmit the data transmission schedule to the network nodes. The network node may perform data transmission to the network managing apparatus or perform data transmission to another network node depending on the received data transmission schedule.

Figure 9:
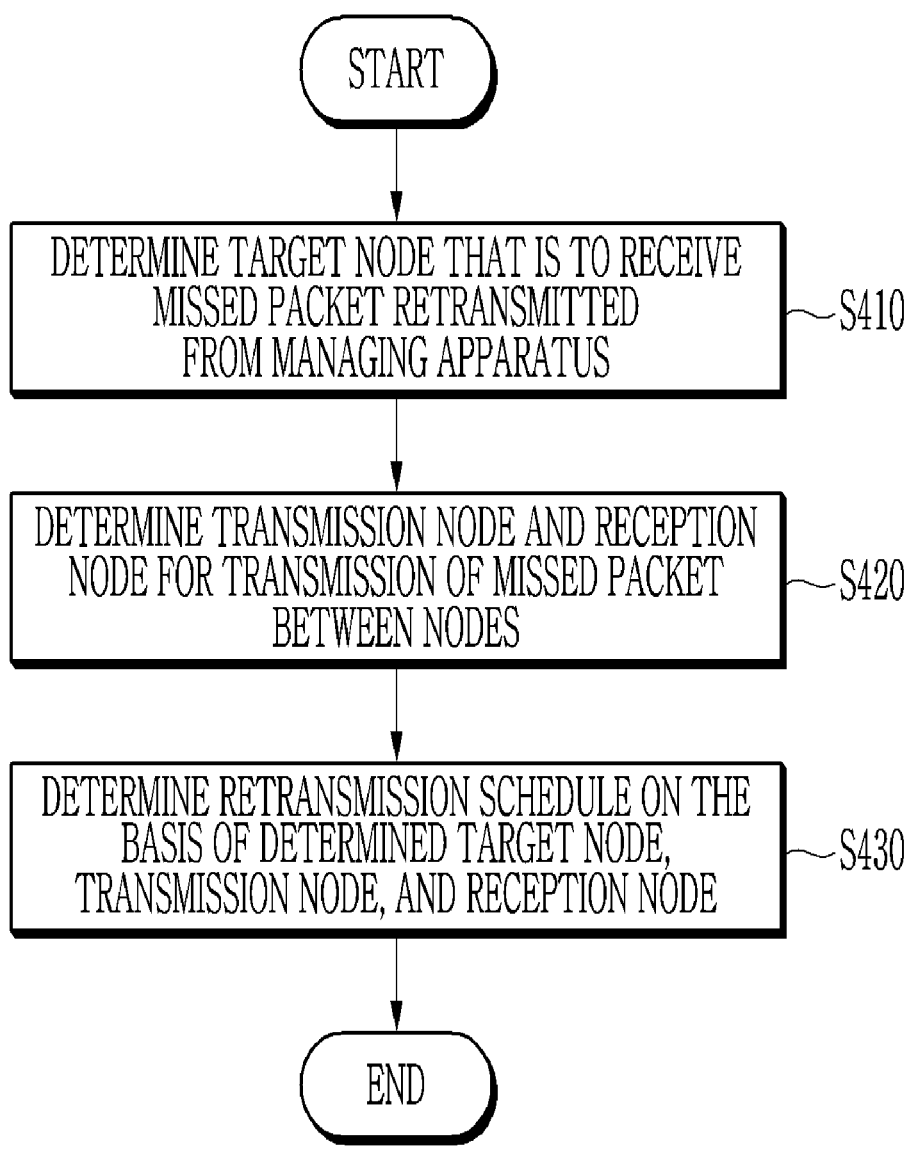
FIG. 9 is a view illustrating a method of generating a data transmission schedule by a network managing apparatus according to an exemplary embodiment of the present invention.

FIG. 9 is a view illustrating a method of generating a data transmission schedule by a network managing apparatus according to an exemplary embodiment of the present invention.

The network managing apparatus (for example, the PANC) determines a target node (nodes) that is to receive a missed packet (packets) retransmitted from the network managing apparatus (S410).

Then, the network managing apparatus determines a transmission network node (hereinafter, referred to as a 'transmission node') (nodes) and a reception network node (hereinafter, referred to as a 'reception node') (nodes) in order to transmit the missed packet between network nodes (S420).

Then, the network managing apparatus determines a data retransmission schedule for the missed packet (packets) on the basis of the determined target node (nodes), transmission node (nodes), and reception node (nodes) (S430).

Hereinafter, a data transmission method according to an exemplary embodiment of the present invention will be described in more detail.

The network managing apparatus may be a PANC, and the network nodes may be sensors. The PANC may transmit common data for a firmware update to a plurality of sensors existing in the network. It is assumed that the number of network nodes (for example, ND1 to ND20) downloading firmware data is twenty. In addition, it is assumed that a data unit of the firmware data is a packet and the firmware data includes twenty six packets (for example, Pkt A, Pkt B, . . . , Pkt Z). Under these assumptions, all the processes of firmware data transmission for a firmware update may be performed as illustrated by the following Table 1.

TABLE 1

| Process | Period/channel/Pkt # | Transmitter/receiver | Detailed description |
|---|---|---|---|
| T1 | CAP/CH0/Pkt CC0 | PANC->ALL | start of firmware (F/W) update (CH = 0, Slot List = 2-5, NumberOfPkt = 26, PktList = A-Z) |
| T2 | GTS/CH0/Pkt A | PANC->ALL | Pkt A |
| T3 | GTS/CH0/Pkt B | PANC->ALL | Pkt B |
| . . . | | | |
| T4 | GTS/CH0/Pkt Z | PANC->ALL | Pkt Z |
| T5 | GTS/CH0/Pkt GC1 | 1->PANC | report portions missed from F/W update (Pkt T, R, E) not expressed in Table 1 |
| T6 | GTS/CH0/Pkt GC2 | 2->PANC | report portions missed from F/W update (Pkt T, B, R, E, C) not expressed in Table 1 |
| T7 | GTS/CH0/Pkt GC3 | 3->PANC | report portions missed from F/W update (Pkt T, B, O, R, E, C) not expressed in Table 1 |
| T8 | GTS/CH0/Pkt GC4 | 4->PANC | report portions missed from F/W update (Pkt F, T, B, O, S, R, E, C) not expressed in Table 1 |
| . . . | . . . | . . . | . . . |
| T9 | GTS/CH0/Pkt GC20 | 20->PANC | report portions missed from F/W update (Pkt F, A, U, L, T, I, V) not expressed in Table 1 |
| T10 | <retransmission scheduling of packet that is not transmitted by PANC> | | |
| T11 | CAP/CH0/Pkt CC30 | PANC->ALL | Inform network nodes of start of continuation of firmware (F/W) update (CH = 0, SlotList = 2-5, NumberOfPkt = 8, PktList = F(@0), A(@0), U(@0), L(@0), T(@0), O(@0), S(@0), R(@0) (CH = 1, SlotList = 2-5, NumberOfPkt = 8, PktList = N/A, C(@1), E(@7), B(@1), I(@12), V(@12), N/A, N/A) |
| T12 | GTS/CH0/Pkt F | PANC->ALL | Pkt F (TO 1-20) |
| | GTS/CH1/Pkt N/A | N/A->N/A | N/A |
| | GTS/CH0/Pkt A | PANC->ALL | Pkt A (TO 6-20) |
| | GTS/CH1/Pkt C | 1->ALL | Pkt C (TO 2-4) |
| T13 | GTS/CH0/Pkt U | PANC->ALL | Pkt U (TO 8-20) |
| | GTS/CH1/Pkt E | 7->ALL | Pkt E (TO 1-6) |
| . . . | . . . | . . . | . . . |
| T14 | GTS/CH0/Pkt R | PANC->ALL | Pkt R (TO 1-8) |
| | GTS/CH1/Pkt N/A | N/A->N/A | |

In Table 1, Pkt CC0 is a packet for informing network nodes of a start of a firmware update, and CC means a Command message in the CAP. Pkt CC30 is a packet for informing network nodes of a start of continuation of the firmware update. Pkts GC1-GC20 are packets for reporting portions missed from the firmware update, and GC means a Command message in the GTS. Pkt A-Pkt Z are packets configuring firmware data, respectively. In addition, in Table 1, CH0 and CH1 are channels existing in one timeslot. The PANC may be network node 0.

Hereinafter, the respective processes T1 to T14 of Table 1 will be described.

First, in T1, the PANC transmits a Pkt CC0 packet to the network nodes ND1 to ND20 through a CH0 channel of a timeslot (for example, Slot#0) belonging to a CAP period. The Pkt CC0 packet may include a 'CH parameter' indicating a channel used for firmware data transmission, a 'SlotList parameter' indicating a timeslot used for data transmission, a 'NumberOfPkt parameter' indicating the number of packets to be transmitted, and a 'PktList parameter' indicating a order of packets to be transmitted.

In Table 1, a case in which twenty six packets are to be transmitted in a order of Pkt A to Pkt Z through channel #0 and timeslots #2-5 is illustrated.

Then, in T2 to T4, the PANC transmits firmware data packets Pkt A to Pkt Z to all the network nodes ND1 to ND20 through broadcasting. In detail, the PANC may transmit the data in a turn unit. In the present description, the turn may represent a unit by which the PANC assigns a transmitter and a receiver in each of the GTS period.

One turn may include a CAP period, which is a shared period, and a GTS period, which is a dedicated period. For example, the CAP period may include two timeslots. In the CAP period, transmission and reception may be possible by any entity. For example, the GTS period may include four timeslots. In the GTS period, transmission and reception may be possible by only determined network nodes.

For example, as illustrated in the following Table 2, in a timeslot 2 (Slot #2) of six timeslots (Slot #0 to Slot #5) belonging to a first turn (Turn #1), the firmware data packet Pkt A may be transmitted from the network node 0 ND0, that is, the PANC (Pkt A(@0)), and be thus broadcast to all the network nodes ND1 to ND20. As described above, the PANC may transmit all the packets from the packet Pkt A to the packet Pkt Z to all the network nodes ND1 to ND20 in a broadcast manner. For the purpose of this data transmission, the channel CH0 may be used. Turn tables for this data transmission are illustrated in Tables 3 to 5. In the following Tables, the channel CH0 may be a common channel.

TABLE 2

| | Turn #1 | | | | |
|---|---|---|---|---|---|
| CAP | | GTS | | | |
| Slot #0 | Slot #1 | Slot #2 | Slot #3 | Slot #4 | Slot #5 |
| CH 0 Pkt CC0 | | Pkt A(@0) | Pkt B(@0) | Pkt C(@0) | Pkt D(@0) |

TABLE 3

| | Turn #2 | | | | |
|---|---|---|---|---|---|
| CAP | | GTS | | | |
| Slot #0 | Slot #1 | Slot #2 | Slot #3 | Slot #4 | Slot #5 |
| CH0 | | Pkt E(@0) | Pkt F(@0) | Pkt G(@0) | Pkt H(@0) |

TABLE 4

| | Turn #3 | | | | |
|---|---|---|---|---|---|
| CAP | | GTS | | | |
| Slot #0 | Slot #1 | Slot #2 | Slot #3 | Slot #4 | Slot #5 |
| CH0 | | Pkt I(@0) | Pkt J(@0) | Pkt K(@0) | Pkt L(@0) |

TABLE 5

| | Turn #6 | | | | |
|---|---|---|---|---|---|
| CAP | | GTS | | | |
| Slot #0 | Slot #1 | Slot #2 | Slot #3 | Slot #4 | Slot #5 |
| CH0 | | Pkt W(@0) | Pkt X(@0) | Pkt Y(@0) | Pkt Z(@0) |

Again, a description will be provided with reference to Table 1.

In T5 and T9, the network nodes report whether or not to receive the data to the PANC. In detail, the network nodes may report numbers of firmware packets that are not received by them to the PANC using a bitmap or an index. In addition, the network nodes may report their available channel numbers, available battery levels, unavailable timeslot numbers, and the like, to the PANC. The network nodes may also report to the PANC information indicating strength and a quality of the wireless signal of the other neighboring nodes. The information indicating the strength and the quality of the wireless signal of the other neighboring nodes may include a received signal strength indicator (RSSI), a link quality index (LQI), and a transmission-reception success rate.

In T10, the PANC determines whether or not the network nodes receive the packets, and generates a data transmission schedule for retransmission of missed packets.

For example, as illustrated in the following Table 6, the PANC may generate the number ('Num Of Missed Nodes') of network nodes that do not receive the packet and a list ('Missed Node List') of the network nodes that do not receive the packet with respect to the respective packets 'Pkt #' using missed packet information received from the respective network nodes.

TABLE 6

| Pkt # | Num Of Missed Nodes | Missed Node List |
|---|---|---|
| Pkt F | 17 | ND4, ND5, ND6, ND7, ND8, ND9, ND10, ND11, ND12, ND13, ND14, ND15, ND16, ND17, ND18, ND19, ND20 |
| Pkt A | 15 | ND6, ND7, ND8, ND9, ND10, ND11, ND12, ND13, ND14, ND15, ND16, ND17, ND18, ND19, ND20 |

TABLE 6-continued

| Pkt # | Num Of Missed Nodes | Missed Node List |
|---|---|---|
| Pkt U | 13 | ND8, ND9, ND10, ND11, ND12, ND13, ND14, ND15, ND16, ND17, ND18, ND19, ND20 |
| Pkt L | 11 | ND10, ND11, ND12, ND13, ND14, ND15, ND16, ND17, ND18, ND19, ND20 |
| Pkt T | 10 | ND1, ND2, ND3, ND4, ND5, ND6, ND7, ND8, ND9, ND10 |
| Pkt B | 8 | ND2, ND3, ND4, ND5, ND6, ND7, ND8, ND9 |
| Pkt O | 8 | ND3, ND4, ND5, ND6, ND7, ND8, ND9, ND10 |
| Pkt S | 8 | ND4, ND5, ND6, ND7, ND8, ND9, ND10, ND11 |
| Pkt R | 8 | ND1, ND2, ND3, ND4, ND5, ND6, ND7, ND8 |
| Pkt E | 6 | ND1, ND2, ND3, ND4, ND5, ND6 |
| Pkt C | 3 | ND2, ND3, ND4 |
| Pkt I | 2 | ND19, ND20 |
| Pkt V | 1 | ND20 |

In Table 6, a case in which seventeen network nodes ND4 to ND20 do not receive the packet PktF is illustrated.

The PANC may generate a packet retransmission schedule for the network nodes with reference to Table 6. It is assumed that two channel resources (for example, CH0 and CH1) are used. When a larger number of channels may be used, several channels may be used at a time.

In Table 6, a packet in which an error most occurs (that is, a packet having the largest 'Num Of Missed Nodes') among the packets may be first retransmitted to the network nodes.

The following Table 7 is a time table illustrating a retransmission schedule.

The packets illustrated in FIG. 6 may be filled in Table 7 in an order of packets in which an error most occurs.

The PANC represented by the network node 0 ND0 retransmits the packet to the network nodes using the channel CH0. When a network node receiving all the packets exists, the corresponding network node may transmit the packet to other network nodes using the remaining channel resource (for example, a channel different from CH0).

TABLE 7

| | Turn #12 | | | | |
|---|---|---|---|---|---|
| | CAP | | GTS | | |
| | Slot #0 | Slot #1 | Slot #2 | Slot #3 | Slot #4 | Slot #5 |
| CH0 | Pkt CC30 | | Pkt F(@0) | Pkt A(@0) | Pkt U(@0) | Pkt L(@0) |
| CH1 | | | | Pkt C(@1) | Pkt E(@7) | Pkt B(@1) |

In Table 7, a case in which the PANG performs transmission of the packet Pkt CC30 through the channel CH0 in a timeslot (for example, Slot #0) belonging to a CAP period of a turn (Turn #12) is illustrated.

In Table 7, a case (that is, Pkt F(@0)) in which the PANG performs retransmission of Pkt F, which is the packet having the largest 'Num Of Missed Nodes', through the channel CH0 in a timeslot 2 (Slot #2) belonging to the turn (Turn #12) is illustrated.

Since the seventeen network nodes ND4 to ND20 do not receive the packet Pkt F, the seventeen network nodes ND4 to ND20 need to receive the packet Pkt F from the PANG using the channel CH0 of the timeslot 2 (Slot #2). Therefore, in the channel CH1 of the timeslot 2 (Slot #2), packet transmission between the network nodes is not performed.

A packet in which an error second most occurs following Pkt F among the packets illustrated in Table 6 is Pkt A, and the PANG likewise transmits the packet Pkt A (that is, Pkt A(@0)). In this case, the PANG may schedule packet transmission between network nodes receiving the packet Pkt A to be performed in the channel CH1 of a timeslot 3 (Slot #3) with reference to Table 6. In detail, the PANG may determine a transmitter that is to perform the packet transmission among the network nodes receiving the packet Pkt A with reference to Table 6. For example, the PANG may select the network node ND5 having the most packets among the network nodes ND1 to ND5 receiving the packet Pkt A as the transmitter with reference to Table 6.

Alternatively, the PANC may predict a result of transmission performed in the previous timeslot of a timeslot in which a network node selected among the network nodes ND1 to ND5 receiving the packet Pkt A is to perform transmission, and determine a network node estimated to have the most packets on the basis of this transmission result prediction as the transmitter. For example, in Table 7, since the network node selected among the network nodes ND1 to ND5 performs the packet transmission in the timeslot 3 (Slot #3), the PANC may predict a result of packet retransmission performed in the timeslot 2 (Slot #2), which is the previous timeslot of the timeslot 3 (Slot #3), and determine a network node estimated to have the most packets on the basis of this prediction as a transmission node. The PANC may perform the transmission result prediction based on the RSSI/LQI/transmission-reception success rate between the transmitting and receiving nodes. Also, the transmitte may be allocated in the order of the downlink GTS slot ID used in the 1:1 communication with the PANC. Therefore, the number of nodes holding the data fragment in which the error occurs can be relatively quickly reduced, and the number of candidate transmitters that can perform the packet transmission can increase relatively quickly.

Then, when the transmitter (or the transmission node) is determined, the PANC may select a packet (that is, a packet in which an error occurs) that is not most received by network nodes (for example, ND1, ND2, ND3, and ND4) except for the transmitter among the network nodes ND1 to ND5 having the packet Pkt A as a packet to be transmitted by the transmitter. For example, since all the network nodes (ND1, ND2, ND3, and ND4) do not receive a packet Pkt C, the PANC may determine the packet Pkt C as a packet that is to be transmitted by the transmitter (for example, the ND5) (that is, Pkt C(@5)).

As described above, a transmitter and a receiver for the channel CH0 and the CH1 of the timeslot 3 (Slot #3) belonging to the turn (Turn #12) illustrated in Table 7 are determined. Likewise, the remaining portions of Table 7 may be filled by this method. As an example, in Table 7, a case in which a packet Pkt U is transmitted by the PANC through the channel CH0 and a packet Pkt E is transmitted by the network node ND7 through the channel CH1, in a timeslot 4 (Slot #4) belonging to the turn (Turn #12) is illustrated. As another example, in Table 7, a case in which a packet Pkt L is transmitted by the PANC through the channel CH0 and a packet Pkt E is transmitted by the network node ND1 through the channel CH1, in a timeslot 5 (Slot #5) belonging to the turn (Turn #12) is illustrated.

Likewise, the PANC may generate a retransmission schedule table for the next turn (Turn #13) by the same method as the method described above, and the retransmission schedule table for the next turn (Turn #13) is illustrated in Table 8.

Packet retransmission may be performed through a required number of turns so that packets that are not received by the network nodes ND1 to ND20 do not exist.

TABLE 8

| | Turn #13 | | | | |
|---|---|---|---|---|---|
| CAP | | GTS | | | |
| Slot #0 | Slot #1 | Slot #2 | Slot #3 | Slot #4 | Slot #5 |
| CH0 | | Pkt T(@0) | Pkt O(@0) | Pkt S(@0) | Pkt R(@0) |
| CH1 | | Pkt I (@12) | Pkt V(@12) | | |

As an example, in Table 8, a case in which a packet Pkt T is transmitted by the PANC through the channel CH0 and a packet Pkt I is transmitted by the network node ND12 through the channel CH1, in a timeslot 2 (Slot #2) belonging to the turn (Turn #13) is illustrated. As another example, in Table 8, a case in which a packet Pkt O is transmitted by the PANC through the channel CH0 and a packet Pkt V is transmitted by the network node ND12 through the channel CH1, in a timeslot 3 (Slot #3) belonging to the turn (Turn #13) is illustrated. As yet another example, in Table 8, a case in which a packet Pkt S is transmitted by the PANC through the channel CH0 in a timeslot 4 (Slot #4) belonging to the turn (Turn #13) and a packet Pkt R is transmitted by the PANC through the channel CH0 in a timeslot 5 (Slot #5) belonging to the turn (Turn #13) is illustrated.

Next, the method (the 'method M200') of disposing the additional channels so that the overlap is minimized will be described.

In the transmission scheduling described above, reception nodes of packets simultaneously transmitted through different channels in one timeslot are not redundant each other.

A case in which the PANC may not perform scheduling so that the reception target nodes are not redundant each other may occur. That is, a case in which the PANC performs scheduling so that the redundancy between the reception target nodes is allowed may occur.

In detail, the PANC may dispose a packet that is not yet allocated in the same timeslot as a timeslot in which the already allocated packet is disposed and a channel different from a channel in which the already allocated packet is disposed. In this case, the PANC may dispose the packet that is not yet allocated in an additional channel in an order in which redundancy between reception network nodes allocated to this timeslot does not exist or is smallest. When there are a plurality of candidate packets satisfying such a disposition rule, the PANC may provide a priority to a packet satisfying a first disposition condition among the plurality of candidate packets. As described above, the first disposition condition may include a condition in which when packets are disposed, the number of network nodes that may receive the corresponding packets is large and the number of network nodes that already receive the corresponding packets is small.

The PANC may perform this additional channel disposition on the basis of the channels or the timeslots. The former is called 'additional channel disposition based on channel priority', and the latter is called 'additional channel disposition based on timeslot priority'. As an example, in the case of the additional channel disposition based on channel priority, the PANC may preferentially dispose packets in a first channel (first channels of different timeslots) of a plurality of channels, and then dispose other packets in a second channel (second channels of different timeslots). As another example, in the case of the additional channel disposition based on timeslot priority, the PANC may preferentially dispose packets in a first timeslot (channels of a first timeslot) of a plurality of timeslots, and then dispose other packets in a second timeslot (channels of a second timeslot).

In the case in which the additional channel disposition based on timeslot priority is used, Table 7 may be changed into the following Table 9. In Table 9, it is assumed that three channels (for example, CH0, CH1, and CH2 are used.

The network nodes ND1 among nodes that already receive the packet Pkt F may transmit the packets Pkt C, Pkt I, and Pkt V in the channel CH1 of the timeslot (Slot #2). The network nodes ND2 and ND3 may transmit the packets Pkt I and Pkt V in the channel CH1 of the timeslot (Slot #2). A packet that may be transmitted to the most network node and is already received by a small number of network nodes among the packets Pkt C, Pkt I, and Pkt V may be selected. For example, the packet Pkt C may be selected. The selected packet Pkt C may be scheduled to be transmitted in the channel CH1 of the timeslot (Slot #2) by the network node ND1. In this case, receivers of the packet Pkt C transmitted in the channel CH1 of the timeslot (Slot #2) and receivers of the packet Pkt F transmitted in the channel CH0 of the timeslot (Slot #2) are partially redundant each other. For example, since the network node ND4 does not receive both of the packet Pkt C and the packet Pkt F, the network node ND4 is redundant as a receiver of the packet Pkt F and the packet Pkt C transmitted in the timeslot (Slot #2).

In this case, the redundant network node ND4 may be scheduled to receive the packet Pkt F through CH0, which is a higher channel of the channels CH0 and CH1 registered as the receiver, in order to efficiently receive the packet.

Meanwhile, although a packet may also be allocated to the channel CH2 of the channels CH0, CH1, and CH2 of the timeslot (Slot #2), a network node that is to receive the packet in the timeslot (Slot #2) does not exist any more, such that a transmitter does not need to be disposed in the channel CH2 of the timeslot (Slot #2). For the same reason, the transmitter does not need to be disposed in the channels CH1 and CH2 of the timeslot (Slot #3), the channel CH2 of the timeslot (Slot #4), and the channel CH2 of the timeslot (Slot #5) any more. As an example, in Table 9, a case in which a packet Pkt F is transmitted by the PANC through the channel CH0 in a timeslot 2 (Slot #2) belonging to the turn (Turn #12) and a packet Pkt C is transmitted by the network node ND1 through the channel CH1 in the timeslot 2 (Slot #2) belonging to the turn (Turn #12) is illustrated. As another example, in Table 9, a case in which a packet Pkt A is transmitted by the PANC through the channel CH0 in a timeslot 3 (Slot #3) belonging to the turn (Turn #12) is illustrated. As yet another example, in Table 9, a case in which a packet Pkt U is transmitted by the PANC through the channel CH0 in a timeslot 4 (Slot #4) belonging to the turn (Turn #12) and a packet Pkt E is transmitted by the network node ND7 through the channel CH1 in the timeslot 4 (Slot #4) belonging to the turn (Turn #12) is illustrated. As yet still another example, in Table 9, a case in which a packet Pkt L is transmitted by the PANC through the channel CH0 in a timeslot 5 (Slot #5) belonging to the turn (Turn #12) and a packet Pkt R is transmitted by the network node ND9 through the channel CH1 in the timeslot 5 (Slot #5) belonging to the turn (Turn #12) is illustrated.

TABLE 9

| | Turn #12 | | | | |
|---|---|---|---|---|---|
| | CAP | | GTS | | |
| | Slot #0 | Slot #1 | Slot #2 | Slot #3 | Slot #4 | Slot #5 |
| CH0 | Pkt CC30 | | Pkt F(@0) | Pkt A(@0) | Pkt U(@0) | Pkt L(@0) |
| CH1 | | | Pkt C(@1) | x | Pkt E(@7) | Pkt R(@9) |
| CH2 | | | x | x | x | x |

Then, the PANG may specify a shared timeslot, a use channel, a packet distributor (transmitter), and a packet receiver for each packet of the firmware data in the retransmission schedule information generated in T10, and transmit the retransmission schedule information to the network nodes. The operation of the PANG described above may be represented by PANG transmission performed in T11 of Table 1 (GTS/CH0/Pkt CC30). That is, the PANG may transmit the packet Pkt CC30 to the network nodes through the channel CH0 of the timeslot belonging to the CAP period.

Again referred to Table 1, in T11, the PANG informs all the network nodes that retransmission of the firmware data starts. In detail, in a description for T11 of Table 1, "CH=0, SlotList=2-5, NumberOfPkt=8, PktList=F(@0), A(@0), U(@0), L(@0), T(@0), O(@0), S(@0), R(@0)" means that eight packets are transmitted using the timeslots (Slot #2 to Slot #5) of the channel CH0, and means that the PANG transmits Pkt F, the PANG transmits Pkt A, the PANG transmits Pkt U, the PANG transmits Pkt L, the PANG transmits Pkt T, the PANG transmits Pkt O, the PANG transmits Pkt S, and the PANG transmits Pkt R (a distribution order and a distributor).

Likewise, in a description for T11 of Table 1, "CH=1, SlotList=2-5, NumberOfPkt=8, PktList=N/A, C(@1), E(@7), B(@1), I(@12), V(@12), N/A, N/A" means that eight packets are transmitted using the timeslots (Slot #2 to Slot #5) of the channel CH1, and means that packet transmission is not performed in the first timeslot and the network node ND5 transmits the packet Pkt C, the network node ND7 transmits the packet Pkt E, the network node ND1 transmits the packet Pkt B, the network node ND12 transmits the packet Pkt I, and the network node ND12 transmits the packet Pkt V in the next timeslots (a distribution order and a distributor).

In addition, in T12 to T14, the PANC and the respective network nodes perform transmission of firmware data packets depending on the retransmission schedule. In detail, the respective network nodes may distribute packets that they receive in timeslots and channels specified by the retransmission schedule, and receive packets that they do not receive in timeslots and channels specified by the retransmission schedule.

Then, the respective network nodes may again report missed packets to the PANC. In addition, the PANC may recalculate the retransmission schedule, allocate transmitters and receivers for each timeslot and each channel, and inform the respective network nodes of the allocated transmitters and receivers. In addition, the PANC and the respective network nodes may again perform transmission of the firmware data packets depending on the recalculated retransmission schedule.

The retransmission of the packets described above may end only when all the network nodes receive all the firmware data packets. The retransmission of the packets described above may be repeated before all the network nodes receive all the firmware data packets.

Figure 10:
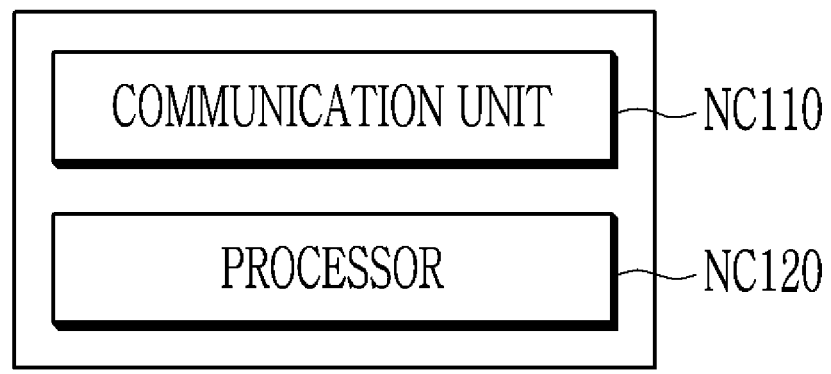
FIG. 10 is a view illustrating a network managing apparatus according to an exemplary embodiment of the present invention.

FIG. 10 is a view illustrating a network managing apparatus NC100 according to an exemplary embodiment of the present invention. The network managing apparatus NC100 managing a plurality of network nodes may be the PANC, the coordinator, or the like, described above. In detail, the network managing apparatus NC100 may include a communication unit NC110 and a processor NC120.

The communication unit NC110 may include general communication components used for communication of the network managing apparatus on a network. In detail, the communication unit NC110 may transmit and receive data to and from at least one network node subscribed to the network using timeslots.

The processor NC120 may generate timeslot identification information indicating timeslots allocated for a downlink of a target node using the network managing method described above. In addition, the processor NC120 may transmit the timeslot identification information to the target node using the communication unit NC110.

The processor NC120 may broadcast at least one data unit to network nodes subscribed to the network using the communication unit NC110. Here, the data unit may be a packet. However, this is only an example, and the present invention may also be applied to the case in which the data unit is not the packet.

The processor NC120 may receive unreceived data information indicating packets that are not received by the network nodes among the transmitted packets, from the network nodes using the communication unit NC110.

The processor NC120 may retransmit at least one packet to at least one network node on the basis of the unreceived data information. In detail, the processor NC120 may generate a retransmission schedule for the retransmission of the packets as described above.

The processor NC120 may transmit information on packets to be broadcast and information on timeslots and channels used for the broadcasting to the network nodes subscribed to the network before broadcasting the packets.

The processor NC120 may broadcast the packets to the network nodes using the GTS.

The processor NC120 may generate a transmission schedule for packet transmission between the network nodes on the basis of the unreceived data information. The processor NC120 may transmit the transmission schedule to at least one network node. In detail, the transmission schedule may include at least one of information on a network node (for example, a first network node) receiving the broadcast packet, information on a network node (for example, a second network node) receiving a packet from the first network node, information on the packet transmitted from the first network node to the second network node, and information on a timeslot in which the packet is transmitted, and information on a channel through which the packet is transmitted.

The processor NC120 may generate a timeslot identification information indicating a timeslot allocated to a downlink of a target node (hereinafter, referred to as a 'retransmission target node') for the retransmission of the packet described above, and transmit the timeslot identification information to the retransmission target node.

The processor NC120 may generate target node identification information indicating the retransmission target node, and transmit the target node identification information to the retransmission target node. In detail, the processor NC120 may transmit the target node identification information and the timeslot identification information to the retransmission target node using the same timeslot. Alternatively, the processor NC120 may transmit the target node identification information and the timeslot identification information to the retransmission target node using different timeslots.

As described above, the timeslot allocated for the downlink of the retransmission target node may be a timeslot in which allocation for the retransmission target node is guaranteed. The timeslot allocated for the downlink of the retransmission target node may be a shared timeslot (for example, DownGTS).

The timeslot identification information may include at least one of a beacon identifier (ID) and a superframe identifier (ID), and a timeslot identifier (ID).

A transmission method of the network managing apparatus NC100 and a firmware update method of the network managing apparatus NC100 will be again described on the basis of the above description.

The network managing apparatus NC100 may broadcast a plurality of packets using a plurality of shared timeslots shared by a plurality of network nodes for downlink communication and a base channel (for example, CH0). In detail, the network managing apparatus NC100 may broadcast information (for example, Slot List of Table 1) on the plurality of shared timeslots, information on the base channel (for example, CH0), the number of (for example, NumberOfPkt of Table 1) of the plurality of packets, and a transmission order (for example, PktList of Table 1) of the plurality of packets through the base channel (for example, CH0) in a timeslot belonging to the CAP period, before broadcasting the plurality of packets.

The network managing apparatus NC100 may determine one or more missed packets that are not received by the plurality of network nodes among the plurality of packets that are broadcast. In detail, the network managing apparatus NC100 may receive a missed packet bitmap indicating one or more missed packets of each of the plurality of network nodes, from each of the plurality of network nodes. The network managing apparatus NC100 may determine the number (for example, 'Num Of Missed Nodes' of Table 6) of missed nodes that do not receive one or more missed packets among the plurality of network nodes, for each of one or more missed packets.

The network managing apparatus NC100 may determine (or schedule) a distributor that is to transmit one or more missed packets and a distribution timeslot and a distribution channel for transmission of one or more missed packets. In detail, the network managing apparatus NC100 may calculate the maximum number (for example, the minimum number of timeslots calculated in ST11) of packets allocated to the distribution channel using the number (for example, PN) of one or more missed packets, the number (for example, CN) of channels for one downlink timeslot, and the number (for example, TSN) of the plurality of shared timeslots. The network managing apparatus NC100 may determine a packet allocated to the distribution channel (for example, CH0) among one or more missed packets on the basis of the number (for example, 'Num Of Missed Nodes' of Table 6) of missed nodes and the maximum number (for example, the minimum number of timeslots calculated in ST11) of packets.

In addition, the network managing apparatus NC100 may perform scheduling so that the packet is not transmitted in an additional channel (for example, CH1) for the distribution timeslot (for example, Slot #2 of Table 7) in the case in which a packet (for example, Pkt F) for which the number (for example, 'Num Of Missed Nodes' of Table 6) of missed nodes is largest among one or more missed packets is allocated to the base channel (for example, CH0) for the distribution timeslot (for example, Slot #2 of Table 7).

In addition, the network managing apparatus NC100 may determine the packet allocated to the distribution channel (for example, CH1) for the timeslot (for example, Slot #3) so that receivers of the packets allocated to the same timeslot (for example, Slot #3) among one or more missed packets are not redundant each other. The network managing apparatus NC100 may include the base channel (for example, CH0) and the additional channel (for example, CH1) as the distribution channels for the distribution timeslot (for example, Slot #3 of Table 7) The network managing apparatus NC100 may determine a network node (for example, ND1) that already receives a packet (for example, Pkt A) among the plurality of network nodes as a distributor that is to transmit a packet (for example, Pkt C) of one or more missed packets through the additional channel (for example, CH1) in the case in which the packet (for example, Pkt A) of one or more missed packets is allocated to the base channel (for example, CH0).

The network managing apparatus NC100 may generate transmission schedule information including information on the distributor and information on the distribution timeslot and the distribution channel, and then broadcast the transmission schedule information using the base channel CH0. Here, the transmission schedule information may further include the maximum number (for example, the minimum number of slots calculated in ST11) of packets and a transmission order (for example, PktList of Table 1) of one or more missed packets. In the case in which the distribution channel is the base channel (for example, CH0), the packet allocated to the base channel (for example, CH0) among one or more missed packets may be transmitted by the network managing apparatus NC100, and in the case in which the distribution channel is the additional channel (for example, CH1), the packet allocated to the additional channel (for example, CH1) among one or more missed packets may be transmitted by at least one of the plurality of network nodes.

The plurality of network nodes may be a plurality of sensors existing in a sensor network, and the plurality of packets may be included in firmware data for updating firmware of the plurality of sensors.

Figure 11:
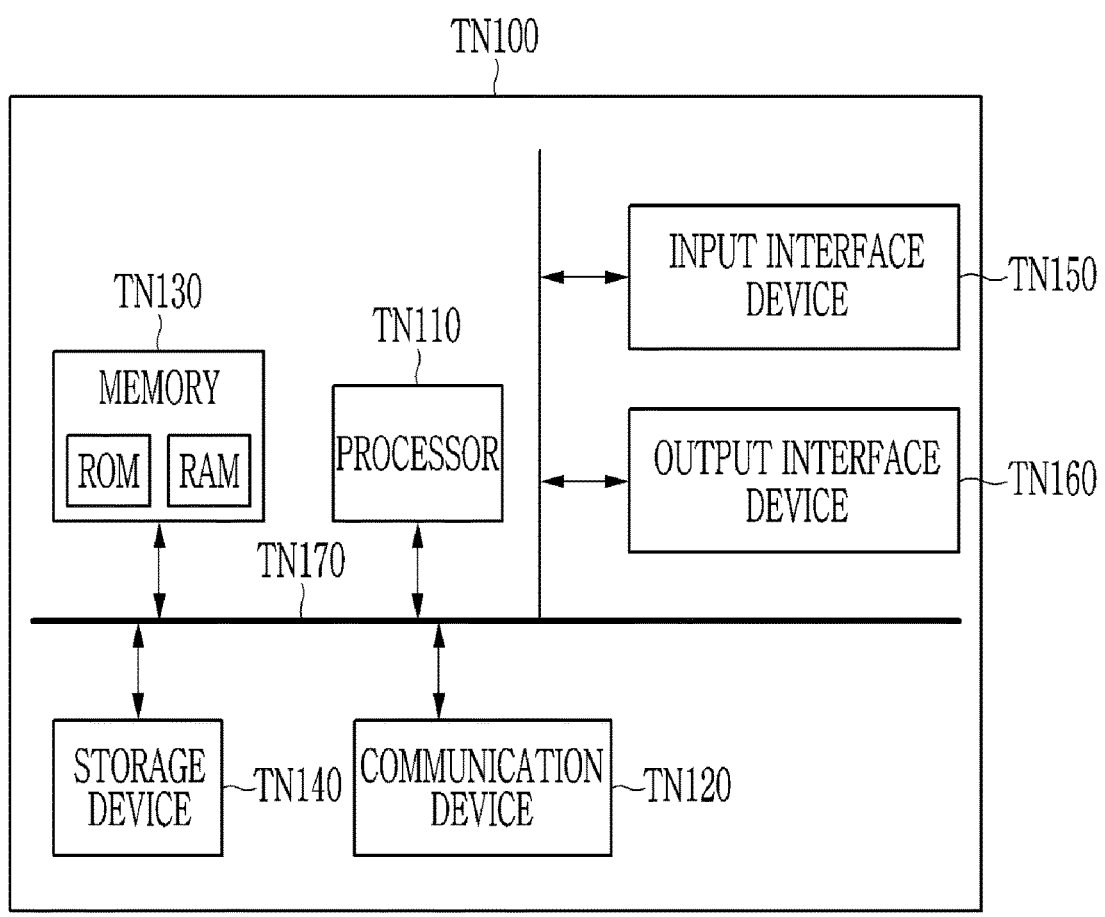
FIG. 11 is a view illustrating a computing apparatus according to an exemplary embodiment of the present invention.

FIG. 11 is a view illustrating a computing apparatus according to an exemplary embodiment of the present invention. The computing apparatus TN100 of FIG. 11 may be the network node, the network managing apparatus, the coordinator, the PANC, or the like, described in the present specification.

In an exemplary embodiment of FIG. 11, the computing apparatus TN100 may include at least one processor TN110, a communication device TN120 connected to a network and performing communication, and a memory TN130. In addition, the computing apparatus TN100 may further include a storage device TN140, an input interface device TN150, an output interface device TN160, and the like. The components included in the computing apparatus TN100 may be connected to each other by a bus TN170 to perform communication with each other.

The processor TN110 may execute a program command stored in at least one of the memory TN130 and the storage device TN140. The processor TN110 may be a central processing unit (CPU), a graphics processing unit (GPU), or a dedicated processor in which the methods according to an exemplary embodiment of the present invention are performed. The processor TN110 may be configured to implement the procedures, the functions, and the methods stated in an exemplary embodiment of the present invention. The processor TN110 may control the respective components of the computing apparatus TN100.

Each of the memory TN130 and the storage device TN140 may store various kinds of information related to the operations of the processor TN110. Each of the memory TN130 and the storage device TN140 may be formed of at least one of a volatile storage medium and a non-volatile storage medium. For example, the memory TN130 may be formed of at least one of a read only memory (ROM) and a random access memory (RAM).

The communication device TN120 may transmit or receive wired signals or wireless signals.

Meanwhile, an exemplary embodiment of the present invention are not implemented through only the apparatus and/or the method described above, but may also be implemented through programs executing functions corresponding to configurations of an exemplary embodiment of the present invention, a recording medium in which the programs are recorded, and the like. In addition, these implementations may be easily made by a person of ordinary skill in the art to which the present invention pertains from the exemplary embodiment described above. In detail, the methods (for example, the network managing method, the data transmission method, the transmission schedule generating method, and the like) according to an exemplary embodiment of the present invention may be implemented in a program command form that may be executed by various computer means and be recorded in a computer readable medium. The computer readable medium may include a program command, a data file, a data structure, or the like, or a combination thereof. The program command recorded in the computer readable medium may be specially designed and configured for an exemplary embodiment of the present invention or may be known to and used by a person of ordinary skill in a computer software field. A computer readable recording medium may include a hardware apparatus configured to store and execute a program command. For example, the computer readable recording medium may be a magnetic medium such as a hard disk, a floppy disk, and a magnetic tape; an optical medium such as a compact disk read only memory (CD-ROM) or a digital versatile disk (DVD); a magneto-optical medium such as a floptical disk, a read only memory (ROM), a random access memory (RAM), a flash memory, or the like. The program command may include a high-level language code that may be executed by a computer through an interpreter, or the like, as well as a machine language code as created by a compiler.

Although the exemplary embodiment of the present invention has been described in detail hereinabove, the scope of the present invention is not limited thereto. That is, several modifications and alterations made by a person of ordinary skill in the art using a basic concept of the present invention as defined in the claims fall within the scope of the present invention.

What is claimed is:

1. A transmission method of a network managing apparatus, comprising:
   broadcasting a plurality of packets using a plurality of shared timeslots shared by a plurality of network nodes for downlink communication and a base channel;
   determining one or more missed packets that are not received by the plurality of network nodes among the plurality of packets;
   determining a distributor that is to transmit the one or more missed packets and a distribution timeslot and a distribution channel for transmission of the one or more missed packets; and
   broadcasting transmission schedule information including information on the distributor and information on the distribution timeslot and the distribution channel using the base channel.

2. The transmission method of a network managing apparatus of claim 1, wherein:
   the determining of the one or more missed packets includes
   determining the number of missed nodes that do not receive the one or more missed packets among the plurality of network nodes, for each of the one or more missed packets.

3. The transmission method of a network managing apparatus of claim 2, wherein:
   the determining includes:
   calculating the maximum number of packets allocated to the distribution channel using the number of one or more missed packets, the number of channels for one downlink timeslot, and the number of the plurality of shared timeslots; and
   determining a packet allocated to the distribution channel among the one or more missed packets on the basis of the number of missed nodes and the maximum number of packets.

4. The transmission method of a network managing apparatus of claim 1, wherein:
   the determining includes:
   determining a first timeslot of the plurality of shared timeslots as the distribution timeslot; and
   determining a packet allocated to the distribution channel for the first timeslot so that receivers of packets allocated to the first timeslot among the one or more missed packets are not redundant each other.

5. The transmission method of a network managing apparatus of claim 1, wherein:
   the distribution channel for the distribution timeslot includes the base channel and a first channel, and
   the determining includes
   determining a first node receiving a first packet among the plurality of network nodes as a distributor that is to transmit a second packet of the one or more missed packets through the first channel in the case in which the first packet of the one or more missed packets is allocated to the base channel.

6. The transmission method of a network managing apparatus of claim 1, further comprising:
   before the broadcasting of the plurality of packets,
   broadcasting information on the plurality of shared timeslots, information on the base channel, the number of the plurality of packets, and a transmission order of the plurality of packets through the base channel in a timeslot belonging to a contention access period (CAP) period.

7. The transmission method of a network managing apparatus of claim 1, wherein:
the determining of the one or more missed packets includes
receiving a missed packet bitmap indicating one or more missed packets of each of the plurality of network nodes, from each of the plurality of network nodes; and
receiving information indicating strength and a quality of a wireless signal of a neighboring node of the plurality of network nodes, from each of the plurality of network nodes.

8. The transmission method of a network managing apparatus of claim 2, wherein:
the distribution channel for a first timeslot of the distribution timeslots includes the base channel and a first channel, and
the determining includes
performing scheduling so that the packet is not transmitted in the first channel for the first timeslot in the case in which a first packet for which the number of missed nodes is largest among the one or more missed packets is allocated to the base channel for the first timeslot.

9. The transmission method of a network managing apparatus of claim 3, wherein:
the transmission schedule information further includes the maximum number of packets and a transmission order of the one or more missed packets.

10. The transmission method of a network managing apparatus of claim 1, wherein:
in the case in which the distribution channel is the base channel, a packet allocated to the base channel among the one or more missed packets is transmitted by the network managing apparatus, and
in the case in which the distribution channel is a first channel different from the base channel, a packet allocated to the first channel among the one or more missed packets is transmitted by at least one of the plurality of network nodes.

11. A network managing apparatus for managing a plurality of network nodes, comprising:
a communication unit broadcasting a plurality of packets using a plurality of shared timeslots shared by the plurality of network nodes for downlink communication and a base channel; and
a processor determining one or more missed packets that are not received by the plurality of network nodes among the plurality of packets, determining a distributor that is to transmit the one or more missed packets and a distribution timeslot and a distribution channel for transmission of the one or more missed packets, and generating transmission schedule information including information on the distributor and information on the distribution timeslot and the distribution channel,
wherein the communication unit broadcasts the transmission schedule information using the base channel.

12. The network managing apparatus of claim 11, wherein:
the processor
determines the number of missed nodes that do not receive the one or more missed packets among the plurality of network nodes, for each of the one or more missed packets.

13. The network managing apparatus of claim 12, wherein:
the processor
calculates the maximum number of packets allocated to the distribution channel using the number of one or more missed packets, the number of channels for one downlink timeslot, and the number of the plurality of shared timeslots, and determines a packet allocated to the distribution channel among the one or more missed packets on the basis of the number of missed nodes and the maximum number of packets.

14. The network managing apparatus of claim 11, wherein:
the processor
determines a packet allocated to the distribution channel for a first timeslot so that receivers of packets allocated to the first timeslot among the one or more missed packets are not redundant each other in the case of determining the first timeslot of the plurality of shared timeslots as the distribution timeslot.

15. The network managing apparatus of claim 11, wherein:
the distribution channel for a first timeslot of the distribution timeslots includes the base channel and a first channel, and
the processor
determines a first node having a first packet among the plurality of network nodes as a distributor that is to perform packet transmission using the first channel of the first timeslot in the case in which the first packet of the one or more missed packets is allocated to the base channel of the first timeslot.

16. The network managing apparatus of claim 12, wherein:
the distribution channel for a first timeslot of the distribution timeslots includes the base channel and a first channel, and
the processor
performs scheduling so that the packet is not transmitted in the first channel of the first timeslot in the case in which a first packet for which the number of missed nodes is largest among the one or more missed packets is allocated to the base channel of the first timeslot.

17. The network managing apparatus of claim 11, wherein:
the communication unit
broadcasts information on the plurality of shared timeslots, information on the base channel, the number of the plurality of packets, and a transmission order of the plurality of packets through the base channel in a timeslot belonging to a CAP period, before broadcasting the plurality of packets.

18. The network managing apparatus of claim 11, wherein:
the plurality of network nodes are a plurality of sensors existing in a sensor network, and
the plurality of packets are included in firmware data for updating firmware of the plurality of network nodes.

19. A method of updating firmware of a plurality of sensors by a personal area network (PAN) coordinator, comprising:
broadcasting a plurality of packets for updating the firmware of the plurality of sensors using a plurality of shared timeslots shared by the plurality of sensors and a base channel;

determining one or more missed packets that are not received by the plurality of sensors among the plurality of packets; and scheduling a distributor that is to transmit the one or more missed packets and a distribution timeslot and a distribution channel for transmission of the one or more missed packets, wherein in the case in which the distribution channel is a first channel different from the base channel, a packet allocated to the first channel among the one or more missed packets is transmitted by at least one of the plurality of sensors.

20. The method of updating firmware of claim 19, further comprising:

before the broadcasting of the plurality of packets, broadcasting information on the plurality of shared timeslots, information on the base channel, the number of the plurality of packets, and a transmission order of the plurality of packets through the base channel in a timeslot belonging to a CAP period.

* * * * *